(12) United States Patent
Yamagami

(10) Patent No.: US 7,445,393 B2
(45) Date of Patent: Nov. 4, 2008

(54) CAMERA AND SHUTTER DEVICE

(75) Inventor: Shigeru Yamagami, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 11/354,460

(22) Filed: Feb. 14, 2006

(65) Prior Publication Data

US 2006/0198631 A1  Sep. 7, 2006

(30) Foreign Application Priority Data

Mar. 2, 2005 (JP) .............................. 2005-057959
Jan. 13, 2006 (JP) .............................. 2006-006448

(51) Int. Cl.
G03B 9/00 (2006.01)
(52) U.S. Cl. ...................................... 396/443; 396/452
(58) Field of Classification Search ....................... None
See application file for complete search history.

(56) References Cited

U.S. PATENT DOCUMENTS 3,759,156 A * 9/1973 Kobori .......................... 396/251
4,364,654 A * 12/1982 Senuma et al. ............... 396/466
5,361,110 A   11/1994 Haraguchi
5,659,821 A *  8/1997 Kawakita et al. ............. 396/248
2005/0276598 A1* 12/2005 Tomatsu ....................... 396/357

FOREIGN PATENT DOCUMENTS

JP    63-169632 A    7/1988
JP    4-307527 A    10/1992

* cited by examiner

Primary Examiner—Melissa Jan Koval
Assistant Examiner—Autumn Parker
(74) Attorney, Agent, or Firm—Canon U.S.A. Inc., I.P. Division

(57) ABSTRACT

At least one exemplary embodiment is directed to a cam gear which can rotate counterclockwise to prepare for photographing. This rotation of the cam gear can cause a cam lever shaft to move from a first cam section that allows a shutter charging lever to be kept in a charged state, over a projection located near an end of the first section, to a second section configured to release the charged state. In conjunction with the movement of the cam lever shaft over the projection, the shutter charging lever momentarily moves from the charged position to an overcharged position, and then moves further to a pre-exposure retracted position.

4 Claims, 8 Drawing Sheets

CAMERA AND SHUTTER DEVICE

BACKGROUND OF THE INVENTION

1. Field of the Invention

The present invention relates to a mechanism for charging a shutter in a camera.

2. Description of the Related Art

Many conventional single-lens reflex cameras use a focal plane shutter. In the focal plane shutter, shutter curtains are charged after a single photographing action. Then, in response to the subsequent pressing of a release button, the force of a driving spring causes the shutter curtains to move from the charged position, thereby allowing a film or an image pickup device to be exposed to light.

There are some conventional mechanisms for charging shutter curtains.

For example, Japanese Patent Laid-Open No. 4-307527 discusses a mechanism that causes a charging member including a cam gear and a cam lever to be driven by the driving force of a motor, thereby charging shutter curtains. To prevent the charging member from blocking the movement of the shutter curtains, this mechanism causes the charging member to move to a pre-exposure retracted position before the movement of the shutter curtains. A second driving mechanism is used to forcibly move the charging member to the pre-exposure retracted position with the power of the motor.

Japanese Patent Laid-Open No. 63-169632 also discusses a mechanism that causes a charging member to be driven by the driving force of a motor, thereby charging shutter curtains. In this mechanism, the charging member is reset to a pre-exposure retracted position by spring force alone.

Conventional shutter charging mechanisms will now be described with reference to FIG. 7 and FIG. 8.

FIG. 7 illustrates an operating state of a cam gear that constitutes a part of a conventional charging mechanism. FIG. 8 illustrates the structure of the cam gear.

FIG. 7 illustrates a driving unit 51 including a motor, a cam lever 52 biased by a spring (not shown) against a cam gear 53, a cam 53a fixed to the cam gear 53, a shaft 52a that rotates while being in contact with the cam 53a, and a contact surface 52b that drives a mirror shutter charging lever (not shown). FIG. 8 illustrates a top dead center section 53b of the cam 53a, a bottom dead center section 53c of the cam 53a, and a lift section 53d of the cam 53a. The top dead center section 53b causes the contact surface 52b of the cam lever 52 to move to the farthest position from the center of the cam gear 53, the bottom dead center section 53c causes the contact surface 52b of the cam lever 52 to move to the closest position to the center of the cam gear 53, and the lift section 53d causes the contact surface 52b of the cam lever 52 to move from the bottom dead center section 53c to the top dead center section 53b.

FIG. 7 illustrates the position of the cam 53a before camera operation, that is, when a user can view a subject image through a finder. In this state, the shaft 52a of the cam lever 52 is at rest in the front half of the top dead center section 53b. When a shutter is released, the motor in the driving unit 51 causes the cam gear 53 (i.e., the cam 53a) to rotate in the counterclockwise direction in FIG. 7. This counterclockwise rotation causes the shaft 52a of the cam lever 52 to move from the top dead center section 53b to bottom dead center section 53c of the cam 53a. Upon detection of the completion of the movement to the bottom dead center section 53c, the motor stops driving the cam gear 53. A spring force that biases the cam lever 52, which is attached to the mirror shutter charging lever (not shown), in the counterclockwise direction causes the cam lever 52 to move from the top dead center section 53b to the bottom dead center section 53c (i.e., the bottom of the cam 53a) in conjunction with the movement of the cam 53a. That is, the cam lever 52 also rotates counterclockwise in FIG. 7.

When the cam lever 52 rotates counterclockwise, the spring attached to the mirror shutter charging lever (not shown) causes the mirror shutter charging lever to follow the movement of the contact surface 52b. The mirror shutter charging lever causes a mirror (not shown) to move from a viewing position (mirror down position), which allows the viewing of a subject image, to a photographing retracted position (mirror up position), which facilitates photographing. The movement of the mirror shutter charging lever causes a shutter charging lever (not shown) to move from a second position, which allows the charging of a shutter, to a first position (the above-described pre-exposure retracted position), which allows shutter curtains to move.

While the shutter charging lever is at the pre-exposure retracted position, when a leading-curtain driving lever of the shutter and a trailing-curtain driving lever of the shutter are driven, the shutter curtains move to expose a film, an image pickup device, or other imaging system, to light. Upon completion of the exposing operation, the motor in the driving unit 51 causes the cam gear 53 (i.e., the cam 53a) to rotate counterclockwise in FIG. 7 again. This counterclockwise rotation causes the shaft 52a of the cam lever 52 to move over the lift section 53d of the cam 53a and allows the cam lever 52 to rotate clockwise. Then, the mirror shutter charging lever follows the clockwise rotation of the cam lever 52 to cause the mirror to be reset from the photographing retracted position (mirror up position) to the viewing position (mirror down position). The movement of the mirror shutter charging lever drives the shutter charging lever to move from the first position (pre-exposure retracted position), which facilitates the movement of the shutter curtains, to the second position, which facilitates the charging of the shutter. Upon detecting that the shaft 52a of the cam lever 52 has reached the top dead center section 53b of the cam 53a, the motor stops driving the cam 53a. Thus, the mirror is held at the mirror down position while the shutter is held at the charged position.

In general, a focal plane shutter is structured as follows. As described above, the power of a motor is used to drive a shutter charging lever and to cause a cam surface of the shutter charging lever to press shutter curtain driving levers (i.e., the above-described leading-curtain driving lever and trailing-curtain driving lever). This action causes shutter curtains to move to a charged position against the biasing force of a driving spring.

In a charged state, the cam surface of the shutter charging lever supports the shutter curtain driving lever to mechanically hold the shutter curtains at the charged position. Therefore, during the time period in which the camera is not in use, the spring force of the driving spring presses the shutter curtain driving levers against the cam surface of the shutter charging lever.

If the camera remains unused for extended periods of time with the shutter charging lever under the load of the driving spring as described above, a film of lubricating oil over the cam surface of the shutter charging lever becomes dried out. As a result, friction increases the initial actuation load and can interfere with proper operation.

Some measures, such as those discussed in Japanese Patent Laid-Open No. 4-307527 and Japanese Patent Laid-Open No. 63-169632, have been taken to reduce such a problem. For example, to ensure that a shutter charging lever is reliably reset to a pre-exposure retracted position, a second driving mechanism is provided to force the shutter charging lever to the pre-exposure retracted position with the power of the motor. Alternatively, a powerful spring is used to ensure the reset of a shutter charging lever. However, the structure with the second driving mechanism causes large impact, impact noise, and vibrations during operation, while the structure with the powerful spring increases a driving force during charging and can cause significant energy loss.

SUMMARY OF THE INVENTION

At least one exemplary embodiment is directed to a camera and a shutter device that facilitate reliable resetting of a shutter charging lever to a pre-exposure retracted position, while preventing an increase in driving force during charging.

At least one exemplary embodiment is directed to a camera and a shutter device that improves the reliability of a resetting operation facilitating a shutter charging lever to be reset to a pre-exposure retracted position.

Specifically, at least one exemplary embodiment is directed to a camera in which a shutter curtain is charged and driven to a charged state against a spring force, and then the charged state is released to facilitate the shutter curtain to be moved by the spring force, and includes a shutter curtain driving lever configured to movably support the shutter curtain and to be biased in a direction in which the shutter curtain is moved by the spring force; a shutter charging lever having a cam surface configured to move and drive the shutter curtain driving lever against the spring force, thereby driving the shutter curtain driving lever to the charged state and holding the shutter curtain driving lever in the charged state; a cam member having a first section configured to allow the shutter charging lever to be kept in the charged state and a second section configured to release the shutter charging lever from the charged state; and a driving unit configured to drive the cam member to rotate; where the cam member has a projection provided in the middle of a path from the first section to the second section and projecting from a cam surface defining the first section.

At least one further exemplary embodiment is directed to a shutter device in which a shutter curtain is charged and driven to a charged state against a spring force, and then the charged state is released to facilitate the shutter curtain to be moved by the spring force, and includes a shutter curtain driving lever configured to movably support the shutter curtain and to be biased in a direction in which the shutter curtain is moved by the spring force; a shutter charging lever having a cam surface configured to move and drive the shutter curtain driving lever against the spring force, thereby driving the shutter curtain driving lever to the charged state and holding the shutter curtain driving lever in the charged state; a cam member having a first section configured to allow the shutter charging lever to be kept in the charged state and a second section configured to release the shutter charging lever from the charged state; and a driving unit configured to drive the cam member to rotate; where the cam member has a projection provided in the middle of a path from the first section to the second section and projecting from a cam surface defining the first section.

Further features of the present invention will become apparent from the following description of exemplary embodiments with reference to the attached drawings.

DESCRIPTION OF THE EMBODIMENTS

Figure 1:
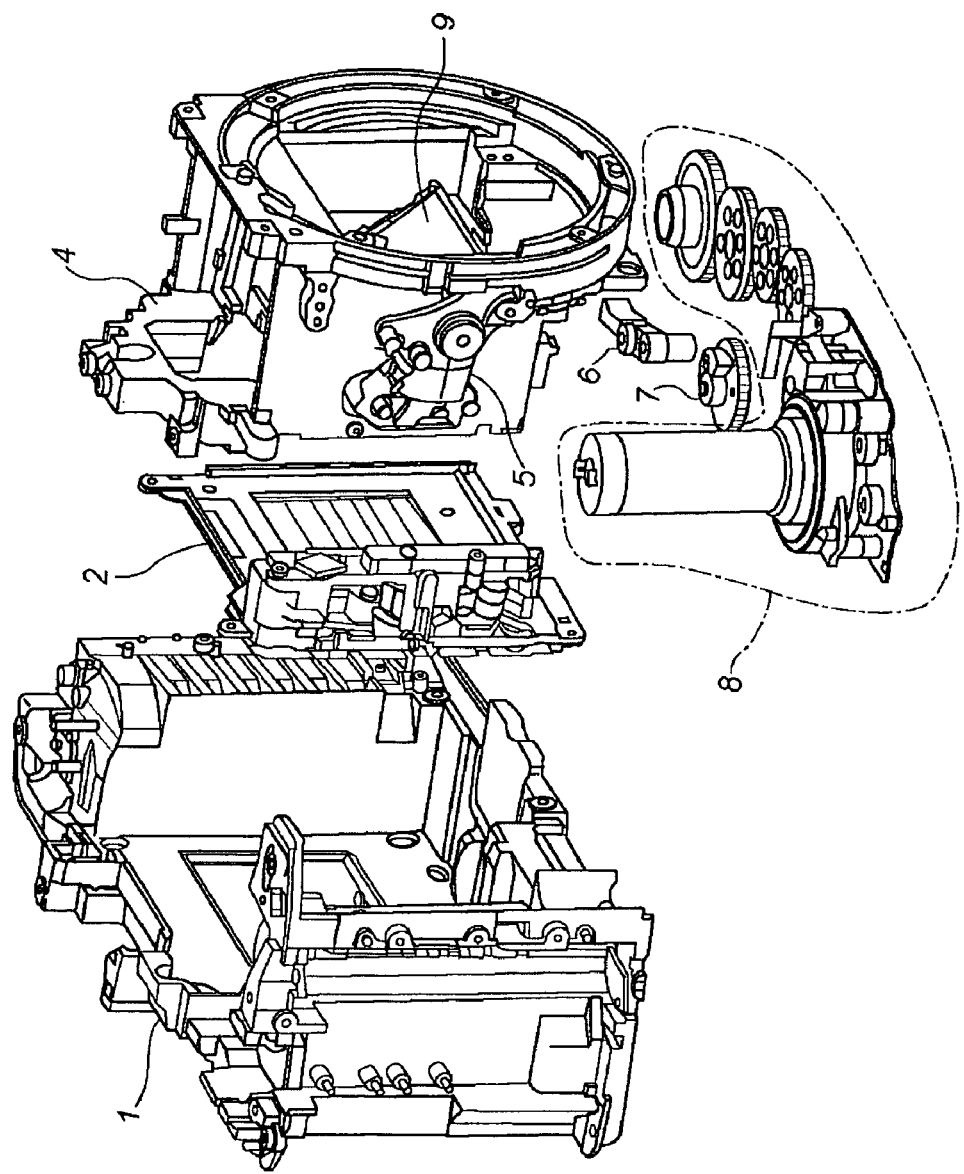
FIG. 1 is an exploded perspective view showing an exemplary structure of a mechanical part of a camera according to at least one exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate.

Notice that similar reference numerals and letters refer to similar items in the following figures, and thus once an item is defined in one figure, it may not be discussed for following figures.

Exemplary embodiments will be described in detail below with reference to the drawings.

Figure 2:
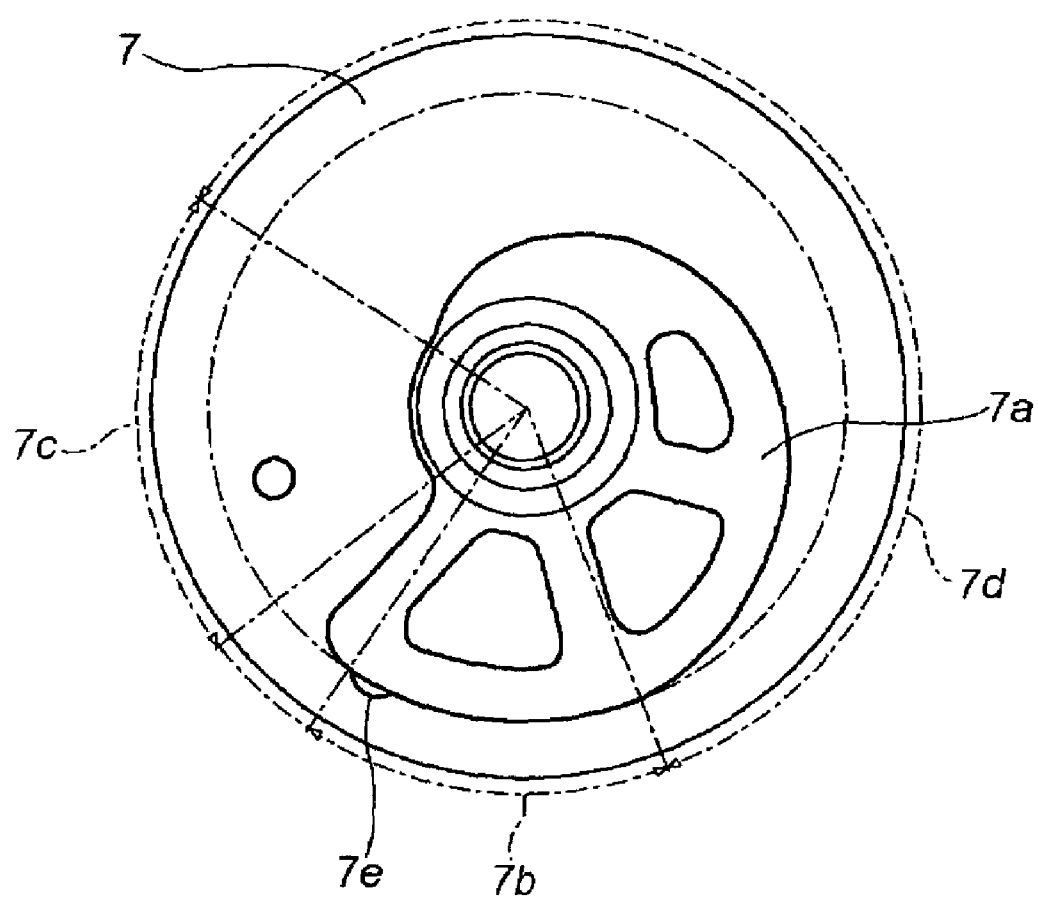
FIG. 2 illustrates an exemplary structure of a cam gear constituting a part of a shutter charging mechanism.
Figure 3A:
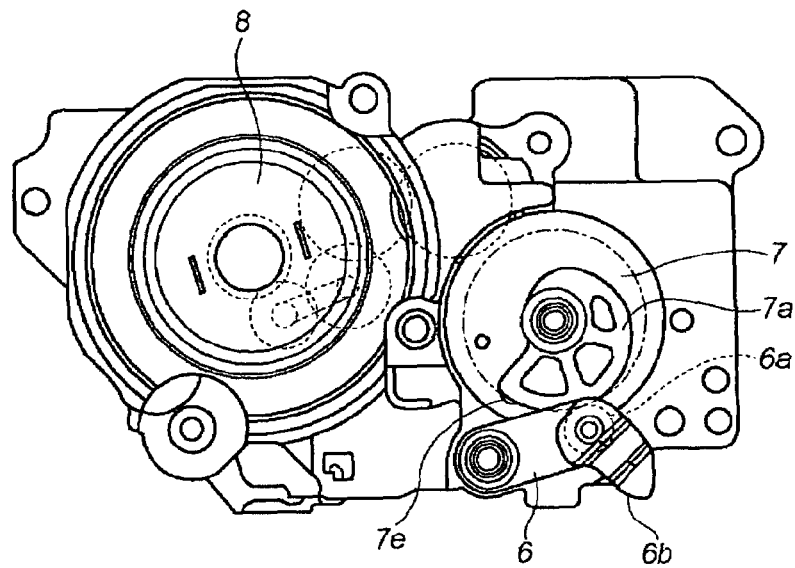
FIG. 3A illustrates an operating state of the cam gear shown in FIG. 2.
Figure 3B:
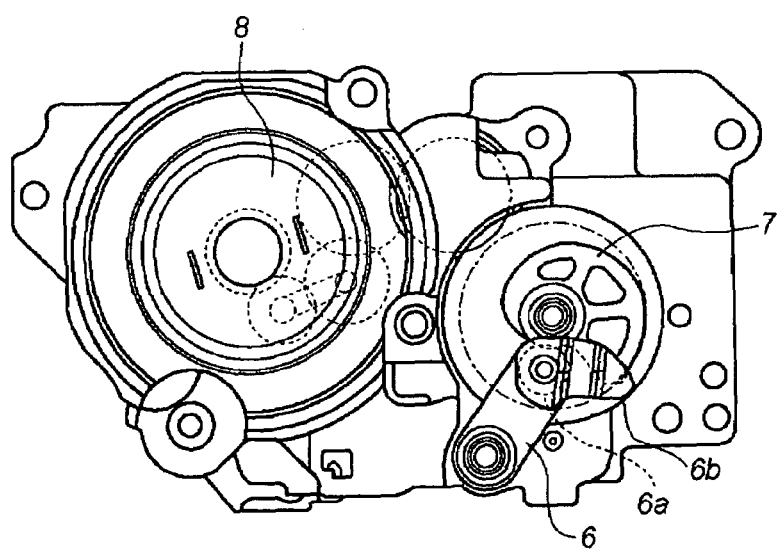
FIG. 3B illustrates another operating state of the cam gear shown in FIG. 2.
Figure 4B:
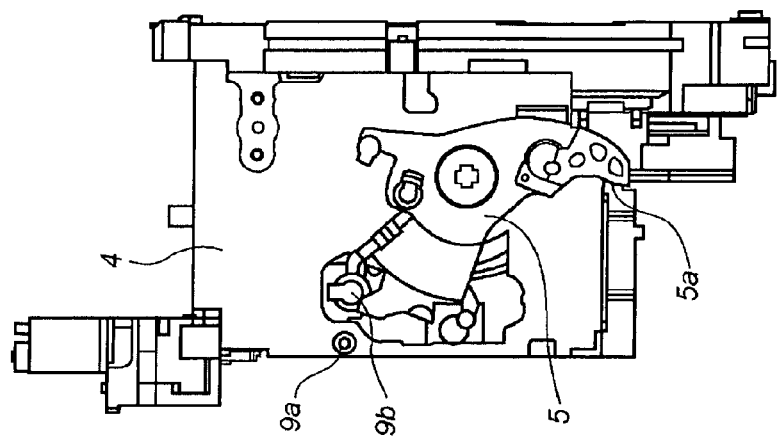
FIG. 4B illustrates another operating state of the mirror shutter charging lever.
Figure 4A:
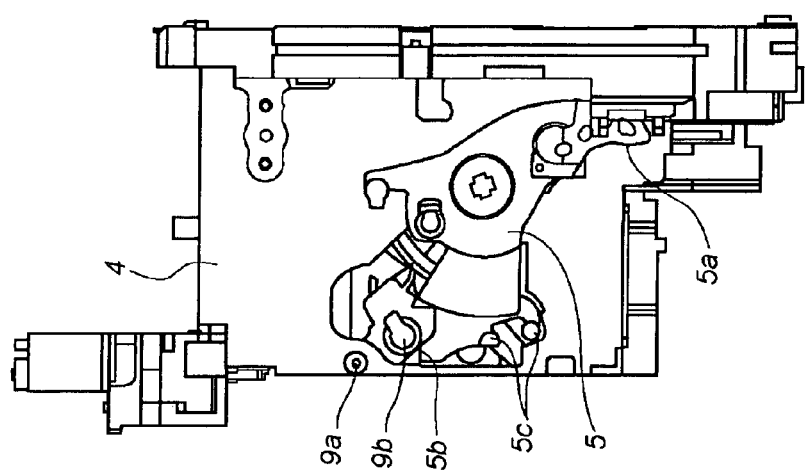
FIG. 4A illustrates an operating state of a mirror shutter charging lever.
Figure 5A:
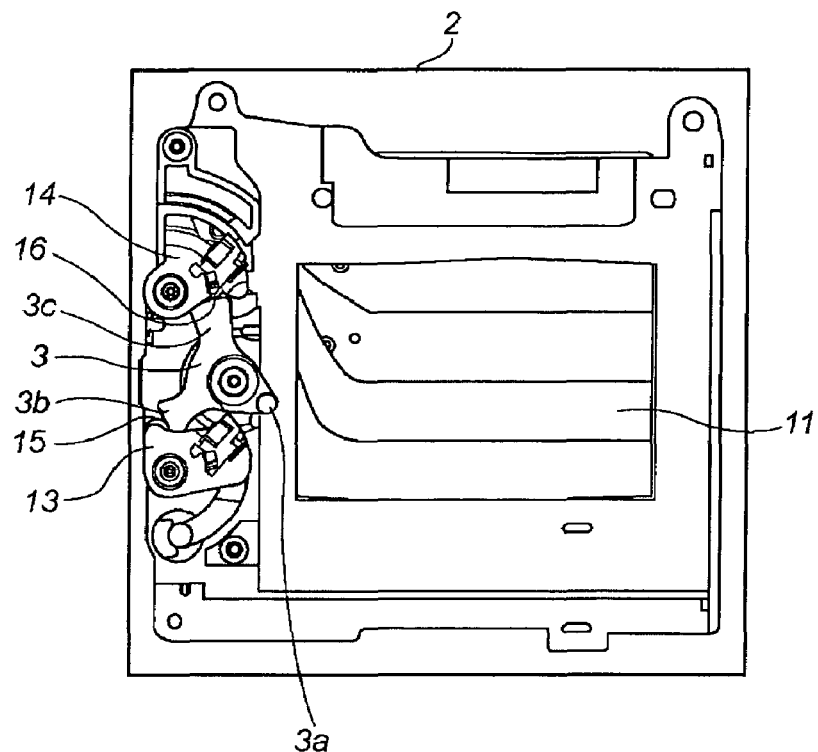
FIG. 5A illustrates an operating state of a shutter and a shutter charging lever.
Figure 5B:
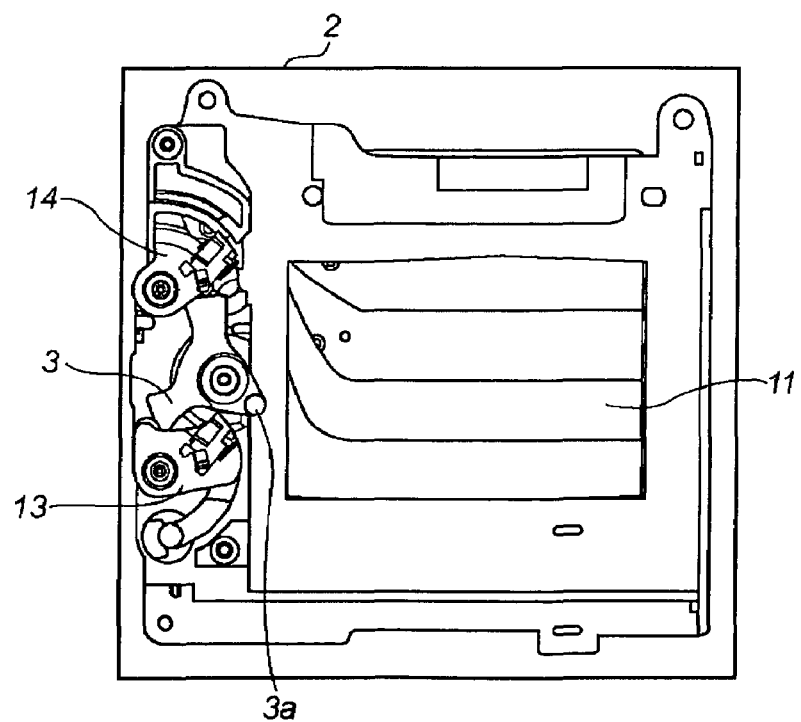
FIG. 5B illustrates another operating state of the shutter and shutter charging lever.
Figure 5C:
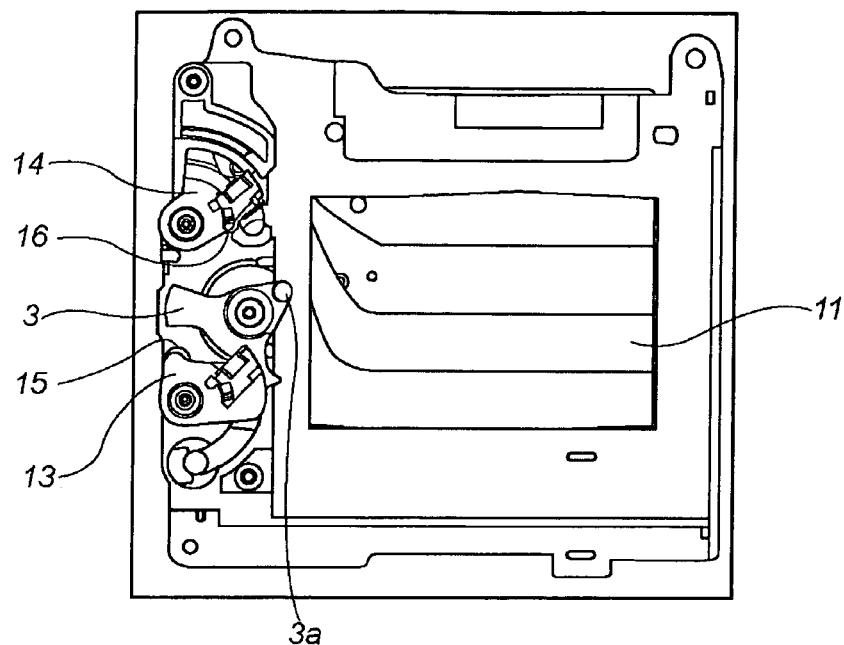
FIG. 5C illustrates still another operating state of the shutter and shutter charging lever.
Figure 5D:
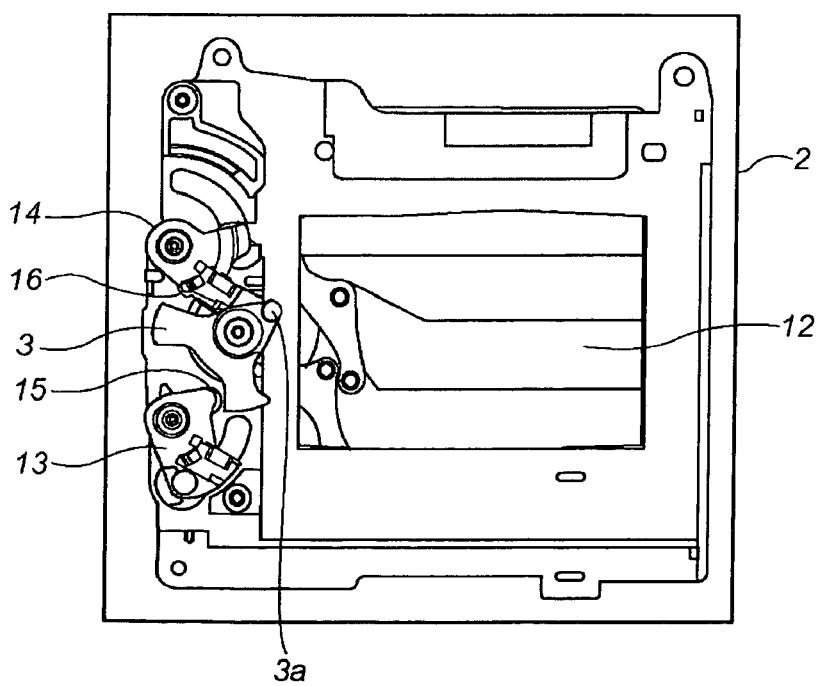
FIG. 5D illustrates still another operating state of the shutter and shutter charging lever.
Figure 6:
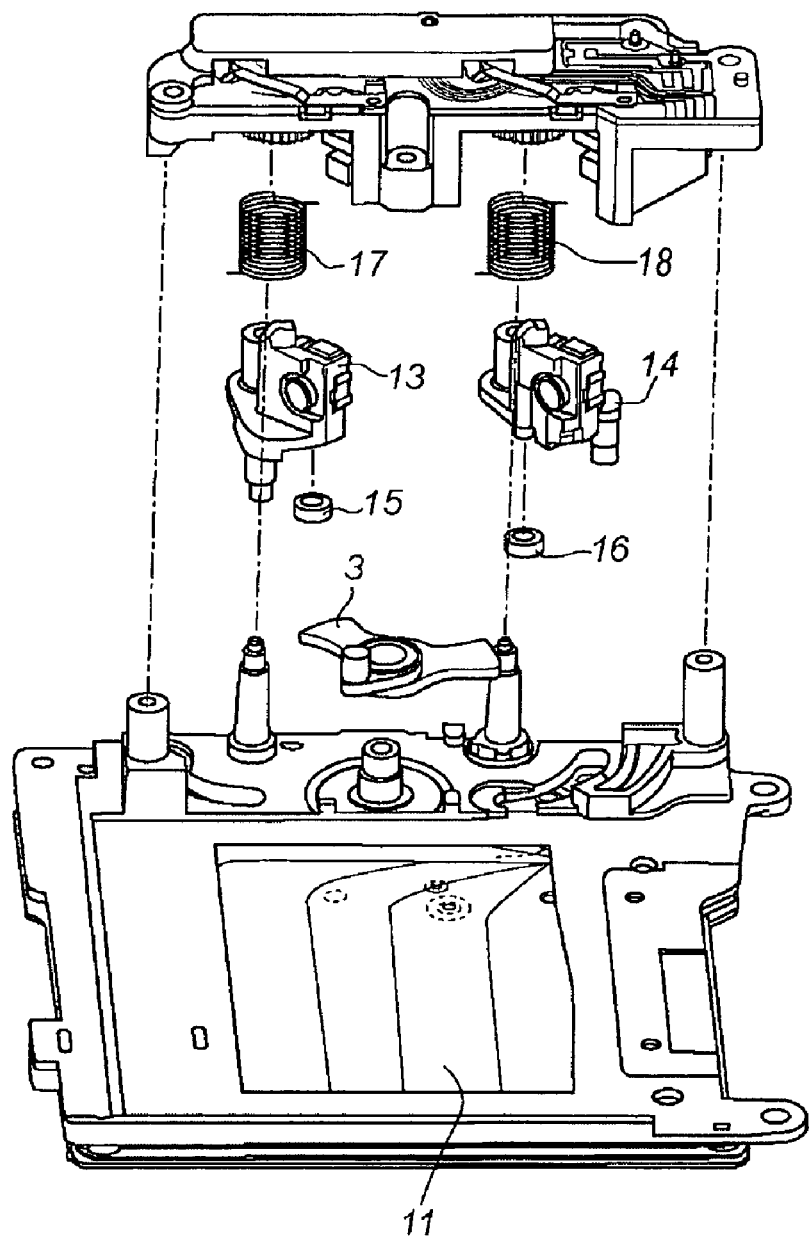
FIG. 6 is an exploded perspective view showing the shutter according to at least one exemplary embodiment.
Figure 7:
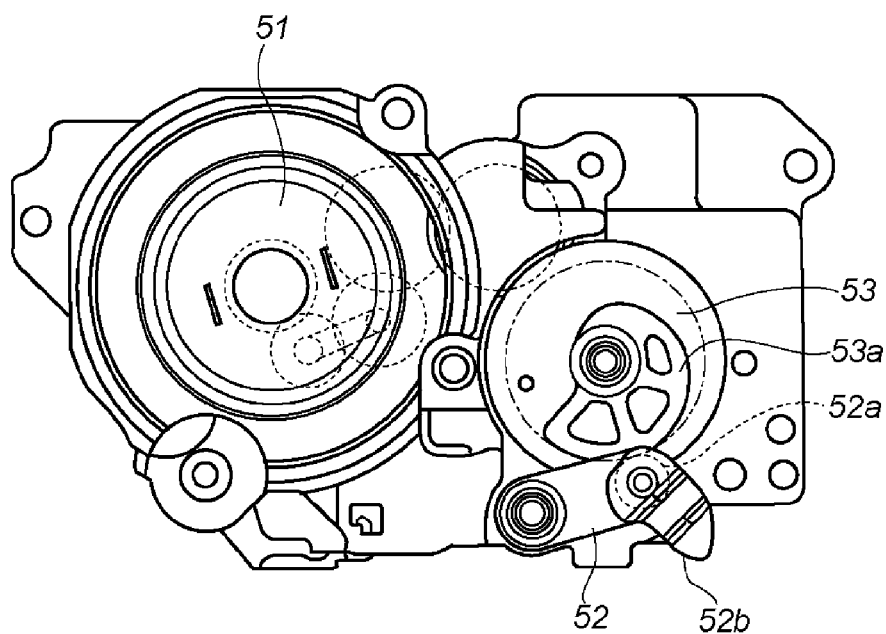
FIG. 7 illustrates an operating state of a conventional cam gear.
Figure 8:
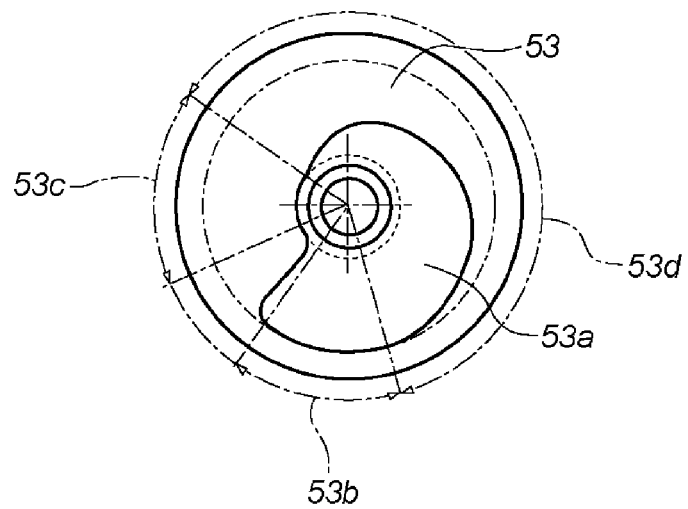
FIG. 8 illustrates an exemplary structure of the conventional cam gear.

FIG. 1 is an exploded perspective view showing an exemplary structure of a mechanical part of a camera according to an exemplary embodiment. FIG. 2 illustrates an exemplary structure of a cam gear constituting a part of a shutter charging mechanism. FIG. 3A and FIG. 3B illustrate operating states of the cam gear shown in FIG. 2. FIG. 4A and FIG. 4B illustrate operating states of a mirror shutter charging lever. FIG. 5A to FIG. 5D illustrates operating states of a shutter and a shutter charging lever. FIG. 6 is an exploded perspective view showing the shutter according to at least one exemplary embodiment.

FIG. 3A illustrates a state in which a cam driving unit constituting a part of a shutter charging mechanism is at a pre-photographing standby position. FIG. 3B illustrates a state in which the cam driving unit is at a ready-for-photographing position (immediately-before-photographing position). FIG. 4A is a side view of a mirror box in a pre-photographing standby state. FIG. 4B is a side view of the mirror box in a ready-for-photographing state (immediately-before-photographing state). FIG. 5A illustrates a shutter unit in a pre-photographing standby state, in which a shutter charging lever is at a second position. FIG. 5B illustrates a state in which the shutter charging lever is at a third position and is in an overcharged state. FIG. 5C illustrates the shutter unit in an immediately-before-photographing state, in which the shutter charging lever is at a first position (pre-exposure retracted position). FIG. 5D illustrates the shutter unit after the completion of a photographing operation.

The following is a description of the reference numerals used in FIGS. 1-6. Reference numeral 1 denotes a camera body and reference numeral 2 denotes a shutter unit. Reference numeral 3 denotes a shutter charging lever, reference numeral 3a denotes a charging shaft, reference numeral 3b denotes a leading-curtain charging cam surface, and reference numeral 3c denotes a trailing-curtain charging cam surface. Reference numeral 4 denotes a mirror box. Reference numeral 5 denotes a mirror shutter charging lever, reference numeral 5a denotes a mirror shutter charging lever contact surface, reference numeral 5b denotes a mirror driving cam part, and reference numeral 5c denotes two shutter charging shafts. Reference numeral 6 denotes a cam lever, reference numeral 6a denotes a cam lever shaft integral with the cam lever 6, and reference numeral 6b denotes a cam lever contact surface. Reference numeral 7 denotes a cam gear and reference numeral 7a denotes a cam. Reference numeral 7b denotes a first section of the cam 7a. Holding the cam lever contact surface 6b in contact with the first section 7b facilitates a quick return mirror (described below) to be held at a viewing position that facilitates the viewing of a subject image. Reference numeral 7c denotes a second section of the cam 7a. The second section 7c brings the cam lever shaft 6a closer to the center of the cam gear 7 than is the case where the cam lever contact surface 6b is in contact with the first section 7b. Reference numeral 7d denotes a lift section of the cam 7a. The lift section 7d allows the cam lever contact surface 6b to move from the second section 7c to the first section 7b. Reference numeral 7e denotes a projection 7e provided near an end of the first section 7b of the cam 7a and slightly projecting from the cam surface of the first section 7b. Reference numeral 8 denotes a driving unit including a motor and can serve as a driving source. Reference numeral 9 denotes a quick return mirror, reference numeral 9a denotes a rotation shaft rotatable supported by the mirror box 4 and rotatable supporting the quick return mirror 9, and reference numeral 9b denotes a mirror driving shaft. Reference numeral 11 denotes a leading blade (leading curtain) unit of a shutter and reference numeral 12 denotes a trailing blade (trailing curtain) unit of the shutter. Reference numeral 13 denotes a leading-blade driving lever 13 of the shutter and reference numeral 14 denotes a trailing-blade driving lever of the shutter. Reference numeral 15 denotes a leading-curtain charging roller and reference numeral 16 denotes a trailing-curtain charging roller. Reference numeral 17 denotes a leading-curtain (leading blade) driving spring and reference numeral 18 denotes a trailing-curtain (trailing blade) driving spring.

The operation of the shutter charging mechanism will now be described with reference to FIG. 1 to FIG. 6.

FIG. 3A illustrates a state in which the cam driving unit constituting a part of the shutter charging mechanism is at the pre-photographing standby position. The cam lever shaft 6a is integral with the cam lever 6 and is in contact with the cam 7a. In this pre-photographing standby state, the cam lever 6 is at rest in the front half of the first section 7b of the cam 7a.

The cam lever contact surface 6b is in contact with the mirror shutter charging lever contact surface 5a of the mirror shutter charging lever 5 and causes the mirror shutter charging lever 5 to rotate. In the pre-photographing standby state shown in FIG. 3A, the cam lever contact surface 6b comes into contact with the mirror shutter charging lever contact surface 5a to hold the mirror shutter charging lever 5 in the state shown in FIG. 4A.

In the pre-photographing standby state shown in FIG. 3A and FIG. 4A, the quick return mirror 9 is held at the viewing position (mirror down position) by a mirror down spring (not shown). The mirror shutter charging lever 5 is biased by a mirror shutter charging lever spring (not shown) in the clockwise direction in FIG. 4A. This clockwise biasing force (i.e. torque) to the mirror shutter charging lever 5 is set to be larger than the biasing force (i.e. torque) of the mirror down spring to the quick return mirror 9. Therefore, when the mirror shutter charging lever 5 is in a freely rotatable state, the mirror shutter charging lever 5 lifts the mirror driving shaft 9b of the quick return mirror 9 with the biasing force of the mirror shutter charging lever spring. This action allows the quick return mirror 9 to move to a mirror up position.

The two shutter charging shafts 5c integral with the mirror shutter charging lever 5 are in contact with the charging shaft 3a, which is integral with the shutter charging lever 3 and interposed between the two shutter charging shafts 5c. In the pre-photographing standby state shown in FIG. 3A and FIG. 4A, the charging shaft 3a, that is, the shutter charging lever 3 is held by the shutter charging shafts 5c of the mirror shutter charging lever 5 at the second position (shutter charged position) shown in FIG. 5A.

Referring to FIGS. 5A-6, in the pre-photographing standby state shown in FIG. 5A, the leading-curtain driving spring 17 and the trailing-curtain driving spring 18 bias the leading-blade driving lever 13 and the trailing-blade driving lever 14, respectively, in the clockwise direction in FIG. 5A. The leading-blade driving lever 13 and the trailing-blade driving lever 14 rotatably support the leading blade unit 11 and trailing blade unit 12, respectively. The leading-curtain charging roller 15 and the trailing-curtain charging roller 16 rotatably support the leading-blade driving lever 13 and the trailing-blade driving lever 14, respectively. In the pre-photographing standby state shown in FIG. 5A, the leading-curtain charging roller 15 and the trailing-curtain charging roller 16 are in contact with the leading-curtain charging cam surface 3b and the trailing-curtain charging cam surface 3c, respectively, which are integral with the shutter charging lever 3. This facilitates the leading-curtain charging roller 15 and the trailing-curtain charging roller 16 to be mechanically held at stop positions (in the charged state). Thus, in the pre-photographing standby state, the leading-blade driving lever 13 and the trailing-blade driving lever 14 are mechanically held at charged positions against the clockwise biasing force of the leading-curtain driving spring 17 and the trailing-curtain driving spring 18. Therefore, a subject-image viewable state and the pre-photographing standby state, which are the states in which the camera is stored for extended periods of time, are maintained without the use of electrical energy.

A series of operations when the user of the camera performs photographing will now be described.

Pressing a release button (not shown) actuates the camera. The subsequent electrical operations, such as distance measuring and metering operations, will not be described here, as they are performed according to conventional techniques.

Referring to FIGS. 5A-6, contemporaneously with the electrical operations, power is fed to a shutter magnet (not shown), which attracts the leading-blade driving lever 13 and the trailing-blade driving lever 14. Thus, the leading-blade driving lever 13 and the trailing-blade driving lever 14 are mechanically and electrically (magnetically) held in the pre-photographing standby state (charged state).

Referring to FIGS. 1-3B, feeding power to the motor in the driving unit 8 causes the cam gear 7 to rotate counterclockwise from the position shown in FIG. 3A to the position shown in FIG. 3B and to stop. In this process, the cam lever shaft 6a integral with the cam lever 6 moves over the first section 7b of the cam 7a and goes over the projection 7e integral with the first section 7b and located near an end of the first section 7b. This causes the cam lever 6 to momentarily rotate clockwise by the amount of the projection 7e. Then, the cam lever 6 rotates counterclockwise and causes the cam lever shaft 6a to fall to the second section 7c of the cam 7a. During the movement from the first section 7b to the second section 7c, the distance of the cam lever contact surface 6b from the center of the cam gear 7 becomes longer than that in the case where the cam lever shaft 6a is in the first section 7b, only when the cam lever shaft 6a goes over the projection 7e.

Referring to FIGS. 1 -5D, the cam lever 6 that has rotated by the amount of the projection 7e causes the mirror shutter charging lever 5 to rotate counterclockwise further from the position shown in FIG. 4A. Then, in conjunction with the rotation of the mirror shutter charging lever 5, the shutter charging lever 3 rotates slightly clockwise from the position shown in FIG. 5A to the position shown in FIG. 5B. In other words, the shutter charging lever 3, that is, the shutter curtains become slightly overcharged. This rotation of the shutter charging lever 3 causes the leading-curtain charging roller 15 and trailing-curtain charging roller 16 to rotate, and reduces the friction between the leading-curtain charging roller 15 and the leading-curtain charging cam surface 3b, and the friction between the trailing-curtain charging roller 16 and the trailing-curtain charging cam surface 3c. Then, the movement of the cam lever shaft 6a along the shape of the cam 7a to the second section 7c of the cam 7a causes the cam lever 6 to rotate counterclockwise as shown in FIG. 3B and causes the cam lever shaft 6a to move to the bottom dead center (i.e., the bottom of the cam 7a), which is the second section 7c of the cam 7a. When a detector (not shown) detects that the cam lever shaft 6a has reached the bottom dead center of the cam 7a, the cam gear 7 stops at the position shown in FIG. 3B.

When the cam lever shaft 6a moves to the bottom dead center of the cam 7a, the mirror shutter charging lever contact surface 5a of the mirror shutter charging lever 5 follows the movement of the cam lever contact surface 6b of the cam lever 6, since the biasing force of the mirror shutter charging lever spring is applied to the mirror shutter charging lever 5. This causes the mirror shutter charging lever 5 to rotate clockwise from the position shown in FIG. 4A to the position shown in FIG. 4B. In the middle of this rotation, the mirror driving cam part 5b of the mirror shutter charging lever 5 comes into contact with the mirror driving shaft 9b and the biasing force of the mirror shutter charging lever spring causes the mirror driving shaft 9b to rise against the biasing force of the mirror down spring. This causes the quick return mirror 9 to move from the viewing position (mirror down position) to the immediately-before-photographing position (mirror up position) shown in FIG. 4B.

Then, the two shutter charging shafts 5c integral with the mirror shutter charging lever 5 come into contact with the charging shaft 3a. This causes the shutter charging lever 3 to rotate counterclockwise to the pre-exposure retracted position (corresponding to the first position or pre-photographing standby position) shown in FIG. 5C. The leading-blade driving lever 13 and the trailing-blade driving lever 14 are released from the mechanical restraint of the shutter charging lever 3 and can be held by the magnetic attraction of the shutter magnet. That is, the leading-blade driving lever 13 and the trailing-blade driving lever 14 enter the state immediately before exposure.

Next, sequentially releasing the magnetic restraint of the shutter magnet, at predetermined intervals, allows the leading blade unit 11 and trailing blade unit 12 of the shutter to move to expose a film or an image pickup device (not shown) to light. An exposure completion state shown in FIG. 5D is thus entered.

After the completion of the exposure, in the charging operation, the shutter charging lever 3 is moved from the pre-photographing standby position (corresponding to the first position or pre-exposure retracted position) to the shutter charged position (second position). At the same time, the quick return mirror 9 is moved from a photographing retracted position (mirror up position) to the viewing position (mirror down position). This operation will now be described.

After the completion of the exposure operation described above, feeding power to the motor in the driving unit 8 causes the cam gear 7 to rotate counterclockwise. Then, when the state of the cam gear 7 changes from that shown in FIG. 3B to that shown in FIG. 3A, the cam lever shaft 6a moves along the lift section 7d of the cam 7a and allows the cam lever contact surface 6b to come into contact with the mirror shutter charging lever contact surface 5a. This causes the mirror shutter charging lever 5 to rotate counterclockwise from the position shown in FIG. 4B to the position shown in FIG. 4A. Thus, the mirror down spring (not shown) causes the quick return mirror 9 to move from the photographing retracted position (mirror up position) to the viewing position (mirror down position). Contemporaneously, the charging shaft 3a interposed between the two shutter charging shafts 5c is pressed, the shutter charging lever 3 rotates clockwise, and the state of the shutter charging lever 3 changes from that shown in FIG. 5D to that shown in FIG. 5A. Thus, the driving operation that causes the movement to the pre-photographing standby position at which the camera is stored for extended periods of time is completed.

As described above, the projection 7e is provided near an end of the first section 7b that holds the shutter in the charged state. This allows the leading-blade driving lever 13 and trailing-blade driving lever 14 (i.e., shutter charging lever 3) to momentarily move from the charged position toward the overcharged position. Contemporaneously, the friction of the cam surface can change from static friction to kinetic friction. Therefore, since the friction of the cam surface can be reduced (i.e., changing from static to kinetic friction), a powerful spring and a specific driving mechanism, which were conventionally required, become no longer needed for a returning operation to be smoothly performed. Moreover, there is substantially no impact, impact noise, and vibration during this operation. Energy loss during this operation can also be minimized.

Although a single-lens reflex camera using a silver-salt film or an image pickup device has been described as an example in the present exemplary embodiment, exemplary embodiments are not limited to this. Exemplary embodiments are applicable to any camera with a mechanism in which a member driven by a spring force is charged by a lever member having a cam surface, a charged state of the lever member is mechanically retained by a first section of a cam member, and the movement of the lever member from the first section to second section of the cam member releases the retention of the charged state. For example, exemplary embodiments are also applicable to a rangefinder camera not provided with a quick return mirror.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-057959 filed Mar. 2, 2005 and Japanese Application No. 2006-006448 filed Jan. 13, 2006, both of which are hereby incorporated by reference herein in their entirety.

What is claimed is:

1. A camera in which a shutter curtain is charged and driven to a charged state against a spring force, and then the charged state is released to allow the shutter curtain to be moved by the spring force, the camera comprising:

a shutter curtain driving lever configured to movably support the shutter curtain and to be biased in a direction in which the shutter curtain is moved by the spring force;

a quick return mirror having a mirror driving axis;

a shutter charging lever having a charge axis and a cam surface configured to move and drive the shutter curtain driving lever against the spring force, thereby driving the shutter curtain driving lever to the charged state and holding the shutter curtain driving lever in the charged state;

a mirror shutter charging lever configured to contact the charge axis to turn the shutter charging lever and contact the mirror driving axis to turn the quick return mirror;

a cam member configured to turn the mirror shutter charging lever and having on the cam surface a first section configured to allow the shutter charging lever to be kept in the charged state and a second section configured to release the shutter charging lever from the charged state; and a driving unit configured to drive the cam member to rotate;

wherein the cam member has a projection provided in the middle of a path from the first section to the second section and projecting from a cam surface defining the first section.

2. The camera according to claim 1, wherein the cam surface of the shutter charging lever causes the shutter curtain driving lever to move by a roller provided in the shutter curtain driving lever.

3. The camera according to claim 1, wherein the shutter charging lever is driven indirectly by a lever member driven by the cam member, in conjunction with the cam member.

4. The camera according to claim 1, wherein the mirror shutter charging lever causes the quick return mirror included in the camera to move to a mirror down position that allows a subject image to be viewed, and to a mirror up position that allows a subject image to be photographed.

* * * * *